Aug. 9, 1966 V. D. MINCIELI 3,265,437
BACK AND HEADREST SUPPORT
Filed April 2, 1965
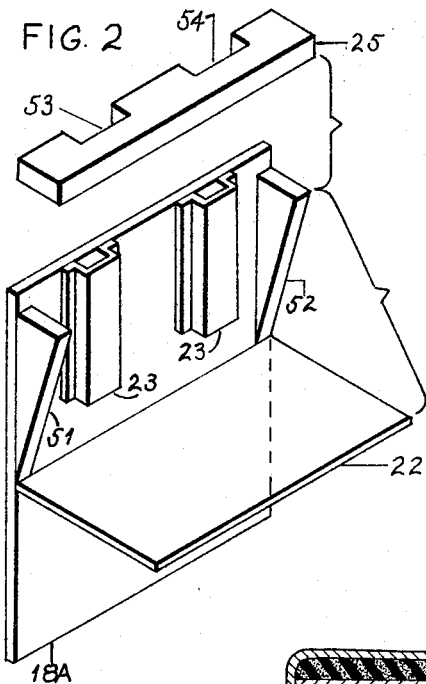
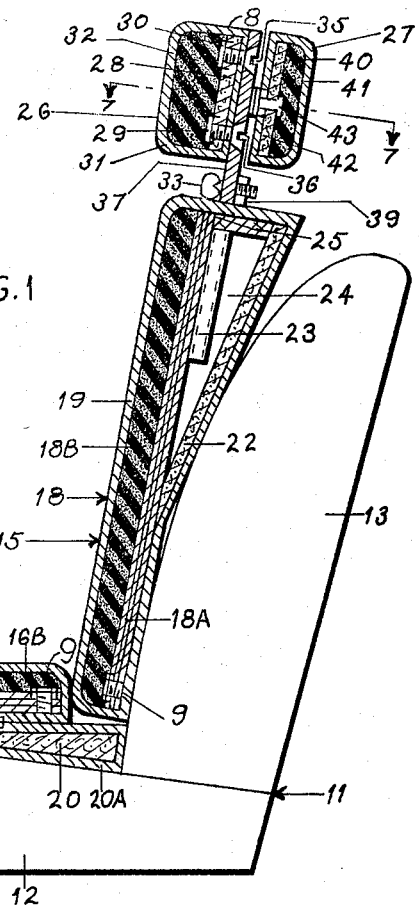
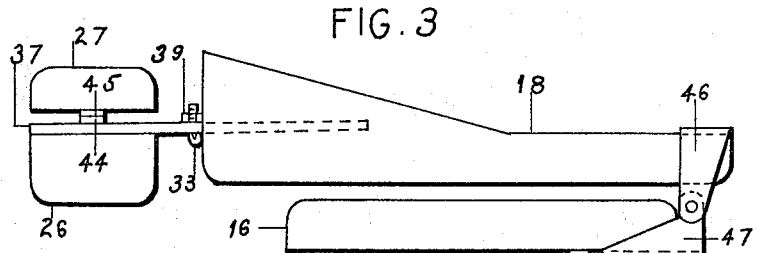
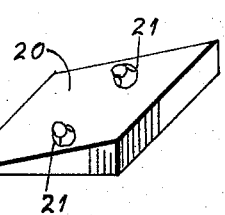
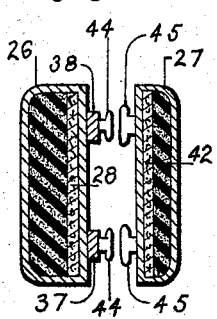
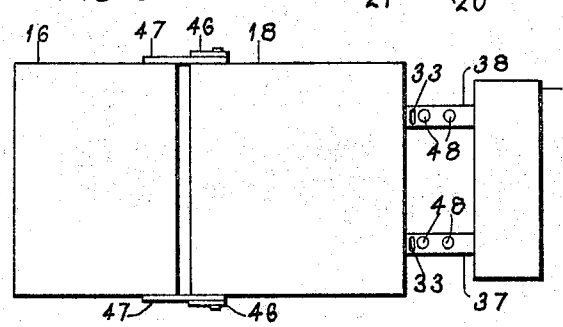
INVENTOR
Vito D. Mincieli

3,265,437
BACK AND HEADREST SUPPORT
Vito Daniel Mincieli, 77—14 58th Ave.,
Elmhurst, N.Y. 11373
Filed Apr. 2, 1965, Ser. No. 445,145
11 Claims. (Cl. 297—378)

My invention relates generally to a back support comprising three sections: a seat section, a back section and a headrest support section, and has particular reference to an improved padded orthopedic adjustable seat, a padded orthopedic back, and a padded adjustable head support particularly suitable for use on a car seat.

It is scientifically designed to provide a firm seat and back support and provide for a proper seating posture relieving back strain and fatigue in driving and also to provide protection for the neck and head and minimize neck snap injuries due to backlash in a car accident.

The established custom in the automobile industry is to construct car seats consisting of a soft seat cushion and an equally soft back cushion in which the seat cushion has a long downward slope toward the back cushion and the back cushion has a long oblique curving slope starting at the bottom of said back cushion and slanting backward and upward towards the rear of the car. The result of such seat construction is a sitting position which is uncomfortable and produces back strain and driving fatigue and poor visibility especially for short drivers.

Prior back supports primarily intended for use on such car seats consisted of a flat seat section or a flat seat section with a small wedge block connected permanently to the undersurface of the seat board at the rear end thereof thus eliminating a small void. Back supports of known construction had seat sections that did little or nothing to eliminate the long downward slope of modern car seat cushions toward the back cushion and the long oblique curving slope of the back cushion, resulting in a sitting position for the driver which is uncomfortable and produces back strain and driver fatigue and did nothing to improve visibility or to protect the neck and head of the driver from injuries due to car accidents.

The object of this invention is to provide an improved back support with a padded seat section designed to eliminate at the discretion of the driver the uncomfortable long downward slope of the seat cushion of a car seat by a readily attachable and detachable long tapered unit mounted on the bottom side of the seat section.

Another object is to provide a padded orthopedic back support with a hollow tapered unit permanently constructed and attached to the back side of the orthopedic ply board of the back section of the back support. This tapered unit eliminates the long oblique curving slope of the back cushion of a car seat.

Another object is to provide a back support with the means for readily attaching and detaching a headrest support to the back section of the back support, and to provide the means for readily attaching a padded back cushion to the front cushion of said headrest support for the protection of a rear seat passenger in case of a car accident.

A further object is to provide the means for readily adjusting the height of the headrest support by sliding movement upwardly and downwardly independently of any movement of the back support and clamping the height of said headrest support to the most protective position of the neck and head of the driver to help prevent and minimize neck snap injuries due to backlash in car accidents.

A still further object is to provide a back support having a seat section and back section with a hinge means pivotally connecting them in a firm and positive manner to insure against accidental or unintentional separation of both sections while driving and to prevent sliding movement horizontally and vertically of both sections in relationship to each other at all times. Also to pivotally connect together from a folded or stored position to operative position on a car seat.

The features included in this invention is to provide an improved padded orthopedic back support scientifically designed to bring the occupant into a truly upright elevated and forward sitting position with firm seat and back support thus relieving back strains and fatigue due to incorrect seating angles of the car seats and to improve visibility while driving and to help protect the neck and head and minimize neck snap injury due to backlash in a car accident.

The objects and features included in this invention relating to details of construction and operation will be apparent in the following description and claims.

Drawings illustrating the various views are:

FIG. 1 is a sectional side view of the back support and headrest support in operative position.

FIG. 2 is an isometric exploded view of the back section of the back support showing the back side of the orthopedic ply board illustrating the construction of the hollow tapered unit.

FIG. 3 is a side view of the back support and headrest support, shown in a folded and stored position.

FIG. 4 is a perspective view of the attachable and detachable long tapered wedge illustrating the snap fasteners.

FIG. 5 is a sectional view taken along line 7—7 FIG. 1.

FIG. 6 is an illustration of the back support and headrest support opened to a fully extended position with the three sections shown in alignment.

Referring to the drawings, in FIG. 1 is shown a typical construction of a car seat 11, comprising a seat cushion 12 and a back cushion 13. As the drawing in FIG. 1 illustrates, the upper surface 12A of a typical car seat cushion 12 is formed with a long downward slope toward the back cushion 13 resulting in an orthopedically incorrect sitting angle 14. The back cushion 13 has a long oblique curving slope starting at the bottom of said back cushion and slanting backward and upward.

Referring now in more detail and by reference characters in the drawing which illustrates the preferred embodiment of the present invention, a back support 15 including a headrest support section 8 is particularly suitable for use on such car seats 11. As shown the back support 15 comprises three sections. A seat section 16, a back section 18, with a hinge means 46 and 47 FIG. 3 and FIG. 6 pivotally joining both sections from an operative position on a car seat to a folded and stored position, and a headrest support section 8.

The seat section 16 includes a rigid base panel 16A of plywood or hard tempered fiber board, a moderately thick layer of resilient padding 16B such as foam rubber or the like, and an outer cover sheet 17 of a suitable material such as vinyl resin plastic. Mounted on the under surface of the seat board 16A as illustrated in FIG. 1 and FIG. 3 is a readily attachable and detachable long tapered wedge unit 20 FIG. 4 made of a light weight low density fiber board or the like also covered with a suitable plastic material 20A FIG. 1 such as used on the seat section. The tapered wedge 20 is provided with two large canvas type snap fasteners 21 or any suitable snap fasteners as illustrated in FIG. 4 and are secured to the wedge unit 20 to mate with two companion fasteners secured to the under surface of the seat board 16A. Any suitable fastening means may be employed in securing the snap fasteners to the long tapered wedge unit 20 and to the under surface of the seat board 16A. One preferred method would be to use soft rivets of the POP type which require no back anvil to set such rivets.

Thus it will be noted that this snap fastener method of attachment of the wedge unit permits a driver at his discretion to alter the elevation of the back part of the seat section 16 of the back support 15 and to eliminate the long downward slope 12A of the seat cushion 12 of a car seat if he so desires.

The back section 18 of the back support 15 designed to eliminate the long oblique upward and backward curving slope of the back cushion 13 of a typical car seat, and also to provide the means for the mounting of the adjustable headrest support 8, includes a rigid orthopedic back board of plywood 18A, a moderately thick layer of resilient padding 18B, a cover sheet 19 of vinyl resin plastic or the like and a built in hollow tapered unit 24 FIG. 1. The hollow tapered unit 24 is mounted on the back side of orthopedic ply board 18A FIG. 2. It includes wood wedges 51 and 52 secured to the back side of ply board 18A FIG. 2 with long type staples. Channels 23 also mounted on the back side of ply board 18A FIG. 2 with any suitable type fastener, provides the means of mounting the headrest support 8 to the back section 18 of the back support, and also provides the means for sliding movement upward or downward of the steel slide bars 37 and 38 FIG. 6 and FIG. 1 of said headrest support 8, permitting an adjustable means for height positioning of said headrest support 8. Wood crosspiece 25 is notched 53 and 54 FIG. 2 to allow the steel slide bars 37 and 38 of headrest support 8 to mount into the channels 23. Both ends of this wood crosspiece 25 are nailed to the base edges of wood wedges 51 and 52 and the notched side is stapled along the top edge of the back side of orthopedic ply board 18A of the back section 18 of the back support. The hollow tapered unit 24 FIG. 1 and FIG. 2 is finished off with a covering of a thin sheet of hard tempered fiber board 22 or the like such as used in cabinet construction and nailed or stapled to the hypotenuse edges of wedges 51 and 52 FIG. 2 and along the long unbroken edge of crosspiece 25 FIG. 2.

Pivoting means of the back section 18 and seat section 16 is provided by a pair of pin hinges 46 and 47 FIG. 3 and FIG. 6 of the type used for flush overlay doors in cabinet construction. Referring to FIG. 1 threaded T nuts 9 are embedded into both the seat board 16A of the seat section and the back board 18A of the back section of the back support. The pin hinges are mounted to both sections in the positions illustrated in FIG. 3 and FIG. 6 by flat head machine screws threading into these T nuts.

The adjustable headrest support section 8 of the back support referring to FIGS. 1, 3, 5, and 6 comprises a front cushion 26 constructed with a head rest board 28 made from a thin sheet of hard tempered fiber board, a thick layer of resilient foam padding 32, a cover sheet 31 of vinyl plastic or the like and two steel slide bars 37 and 38. A number of holes 48 FIG. 6 are drilled through the two steel slide bars 37 and 38 at preselected intervals FIG. 6 to permit adjusting the height of the headrest support 8 by a thumbscrew 33 FIG. 6 and FIG. 1 inserted and secured into a preselected hole 48 FIG. 6 of each said steel slide bar 37 and 38 by a threaded nut 39 FIG. 1, said thumbscrew and threaded nut abutting the top surface of the built in hollow tapered unit 24 FIG. 1. Said steel slide bars are secured to the back side of the front cushion 26 by drilling and countersinking two holes through each steel slide bar and inserting flat head machine screws 35 and 36 FIG. 1 to engage and thread into T nuts 29 and 30 FIG. 1 embedded into headrest board 28. Snap fasteners 44 FIG. 5 are riveted to steel slide bars 37 and 38. The adjustable headrest support section 8 of the back support has a back cushion 27 comprising of a thin sheet of hard tempered fiber board 42, a moderately thick layer of resilient foam padding 40 and a cover sheet 41 of vinyl resin plastic or the like and two companion snap fasteners 45 FIG. 5 riveted to the fiber board 42 by soft rivets FIG. 1 of the POP type which do not require a back anvil to set such rivets. Snap fasteners 45 on the back cushion 27 allow for the quick mounting of said cushion 27 to the companion snap fasteners 44 on the steel slide bars 37 and 38.

I have herein shown and described a preferred embodiment of the invention. It is, however, to be understood that the invention is not limited to the precise construction herein shown, the same being merely illustrative of the principles of the invention.

I claim:

1. An orthopedic support for use on a vehicle seat having a seat cushion and a back cushion, said seat cushion sloping downwardly toward said back cushion, said back cushion sloping upwardly and backwardly from the seat cushion, said support comprising a seat section, a back section, said back section having a tapered portion thereof extending rearwardly at the top, means connecting said sections together for relative pivotal movement between an inoperative folded position and an operative unfolded position, and means for adjustably supporting the seat section on the seat cushion to provide a substantially level position of the seat section at a higher elevation.

2. An orthopedic support as defined by claim 1 in which the means for adjustably supporting the seat section on the seat cushion comprises a wedge-shaped member.

3. An orthopedic support as defined by claim 2 and means for removably attaching the wedge-shaped member to the bottom of the seat section.

4. An orthopedic support as defined by claim 3 in which the means for removably attaching the wedge-shaped member to the bottom of the seat section comprises snap fasteners.

5. An orthopedic support as defined by claim 1 and a head rest section attached to the top of the back section.

6. An orthopedic support as defined by claim 5 in which the head rest section comprises a padded member, a vertical bar secured to the said head rest section, a channel on the back section for receiving said bar, and abutment means for supporting the bar in said channel.

7. An orthopedic support as defined by claim 6 in which the vertical bar is provided with a series of longitudinally spaced apertures and the abutment means are adapted to be removably disposed in any one of said apertures to abuttingly support the head rest section in different elevational positions.

8. An orthopedic support as defined by claim 6 in which the tapered portion of the back section is hollow and the channel is rigidly mounted on the back section in the hollow of said tapered portion.

9. An orthopedic support as defined by claim 8 in which a pair of the channel members are provided in side by side relation within the hollow of the tapered portion and a corresponding pair of vertical bars are secured to the head rest section to register with said channels.

10. An orthopedic support as defined by claim 5 in which the head rest section includes a padded rear section.

11. An orthopedic support as defined by claim 10 in which the head rest section comprises a padded front section and a padded rear section removably attached to the front section.

References Cited by the Examiner

UNITED STATES PATENTS

| | | | |
|---|---|---|---|
| 1,419,006 | 6/1922 | Barrett | 297—231 |
| 2,708,475 | 5/1955 | Krewson | 297—230 |
| 2,716,775 | 9/1955 | Kenimer | 297—378 |
| 2,807,313 | 9/1957 | Kaufman | 297—396 |
| 2,926,951 | 3/1960 | Koplin | 297—378 |
| 3,014,761 | 12/1961 | Otto | 297—230 |
| 3,041,108 | 6/1962 | Cohn | 297—378 |
| 3,114,527 | 12/1963 | Demarest | 297—397 |

FOREIGN PATENTS 1,094,163   5/1955   France.

FRANK B. SHERRY, *Primary Examiner.*
CASMIR A. NUNBERG, *Examiner.*